US006978951B1

United States Patent
Raghu

(10) Patent No.: US 6,978,951 B1
(45) Date of Patent: Dec. 27, 2005

(54) REVERSING CHAMBER OSCILLATOR

(75) Inventor: Surya Raghu, Ellicott City, MD (US)

(73) Assignee: Bowles Fluidics Corporation, Columbia, MD (US)

( * ) Notice: Subject to any disclaimer, the term of this patent is extended or adjusted under 35 U.S.C. 154(b) by 733 days.

(21) Appl. No.: 09/427,985

(22) Filed: Oct. 27, 1999

Related U.S. Application Data

(60) Provisional application No. 60/105,948, filed on Oct. 28, 1998.

(51) Int. Cl.$^7$ ................................................. B05B 1/08
(52) U.S. Cl. ................................ 239/589.1; 239/284.1
(58) Field of Search .......................... 239/589, 589.1, 239/284.1, 284.2; 137/842, 826, 806, 803, 809, 808, 810, 811

(56) References Cited

U.S. PATENT DOCUMENTS

| 3,507,275 | A | | 4/1970 | Walker | 128/173 |
|---|---|---|---|---|---|
| 3,638,866 | A | | 2/1972 | Walker | 239/544 |
| 4,184,636 | A | * | 1/1980 | Bauer | 239/11 |
| RE33,448 | E | * | 11/1990 | Bauer | 239/589.1 X |
| RE33,605 | E | * | 6/1991 | Bauer | 239/589.1 |
| 5,129,585 | A | | 7/1992 | Bauer | 239/589.1 |
| 5,749,525 | A | * | 5/1998 | Stouffer | 239/284.1 |
| 6,110,292 | A | * | 8/2000 | Jewett et al. | 239/589.1 |

FOREIGN PATENT DOCUMENTS

WO    WO 97/35116    9/1997

\* cited by examiner

Primary Examiner—Christopher S Kim
(74) Attorney, Agent, or Firm—Jim Zegeer

(57) ABSTRACT

A reversing chamber oscillator has an oscillation chamber with a reversing wall, a centrally located power nozzle for issuing a jet of liquid toward the reversing wall, and a pair of liquid passages from the reversing chamber on each side of the power nozzle, respectively, for alternately issuing periodic pulses of liquid. The outlet passages are smoothly extended to intersect directly at a common outlet and are dimensioned and angulated relative to each other to control the sweep angle of a liquid jet which is periodically swept in the common outlet and issued to ambient. The pair of fluid passages have an upstream end at the reversing chamber and a downstream end at the common outlet and each passage has an outer wall which, with the reversing wall, define an oval.

12 Claims, 2 Drawing Sheets

REVERSING CHAMBER OSCILLATOR

REFERENCE TO RELATED APPLICATIONS

This invention is the subject of provisional application Ser. No. 60/105,948 filed Oct. 28, 1998 and entitled REVERSING CHAMBER OSCILLATOR.

BACKGROUND AND BRIEF DESCRIPTION OF THE INVENTION

The present invention relates to reversing chamber fluidic oscillators of the type in which a reversing chamber oscillator issues discrete pulses of fluid in alternation from two or more outlet openings as disclosed U.S. Pat. No. 4,184,636 for example, which is incorporated herein by reference.

SUMMARY OF THE INVENTION

According to the present invention, the reversing chamber fluidic oscillator incorporates a pair of outlet passages from the reversing chamber which outlet passages lead smoothly and in a gradually curved manner, without sharp significant changes in direction, to intersect at a common outlet. Each of the outlet passages has an upstream end beginning at the reversing chamber and a downstream end at the common outlet. Each outlet passage first gradually narrows to a minimum cross-sectional area and then gradually expands to a maximum cross-sectional area at the common outlet. The common outlet has a pair of sidewalls which diverge in a downstream direction toward ambient.

The reversing chamber has a power nozzle inlet and a far wall surface opposite the power nozzle which serves as a reversing wall. The reversing chamber, with its outside wall or reversing chamber wall surface, and the outer surfaces of the pair of outlet passages define an oval shape.

Thus, the object of the invention is to provide a liquid spray device having a reversing chamber oscillator having an oscillation chamber with a reversing wall and a power nozzle for issuing a liquid jet towards the reversing wall. A pair of liquid passages or channels lead smoothly from the reversing chamber on each side of the power nozzle and carry discrete liquid pulses in alternation through the two channels. The outlet passages or channels are smoothly extended to intersect at a common outlet to ambient and are dimensioned and angulated relative to each other at the common outlet to control the fan angle of the merged liquid jets which is periodically swept in the common outlet opening to ambient. Moreover, the liquid passages each have an upstream end at the reversing chamber and a downstream end at the common outlet. Each passageway has an outer wall, which, with the reversing wall, define an oval. The jet of merged liquid is swept in the common outlet, and the passages and angulations are such that the mean droplet size in the operating fluid pressure range of from 5–30 psi remains above about 1500 microns.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
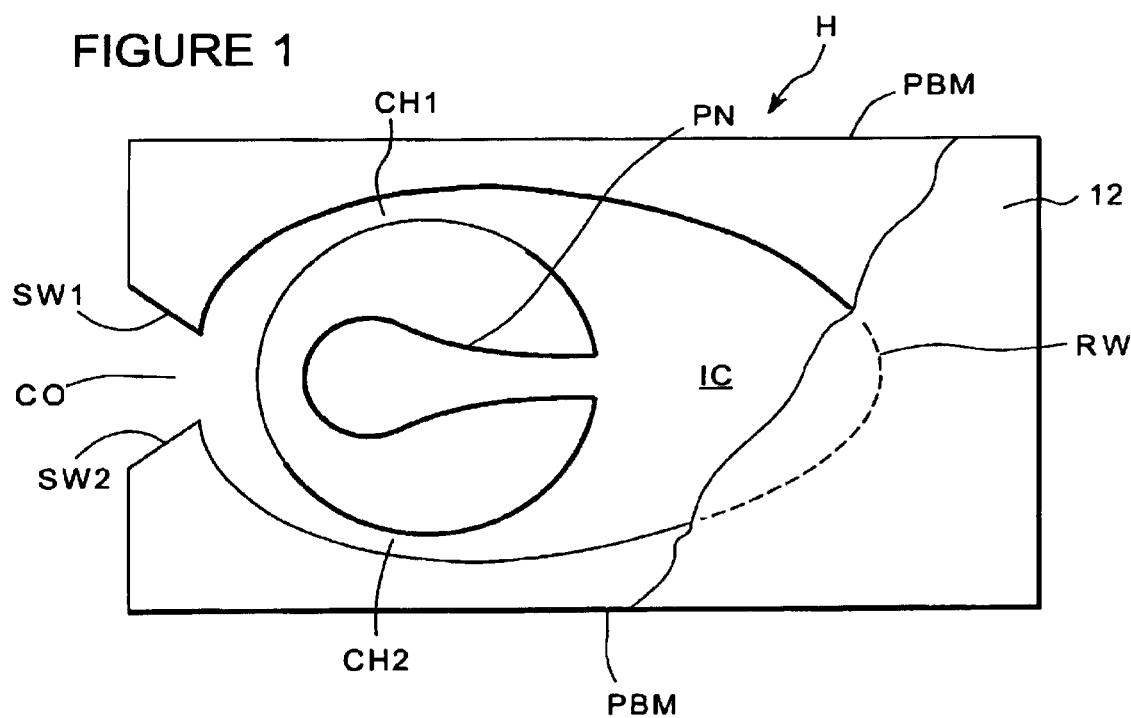
FIG. 1 is a top plan view of a reversing chamber oscillator incorporating the invention, with a portion of the cover removed to expose the internal silhouette or fluidic oscillator circuit.
Figure 2A:
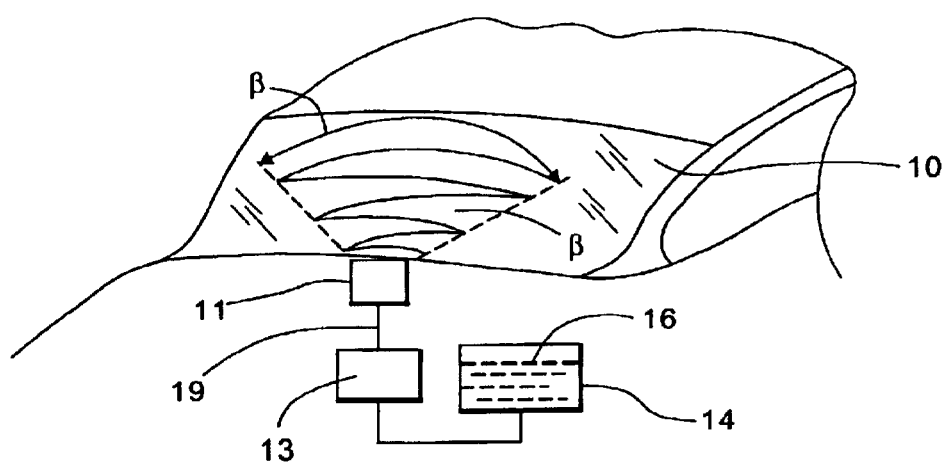
FIG. 2A is a diagrammatic sketch of an automobile windshield washer system in which the invention has been incorporated.
Figure 2B:
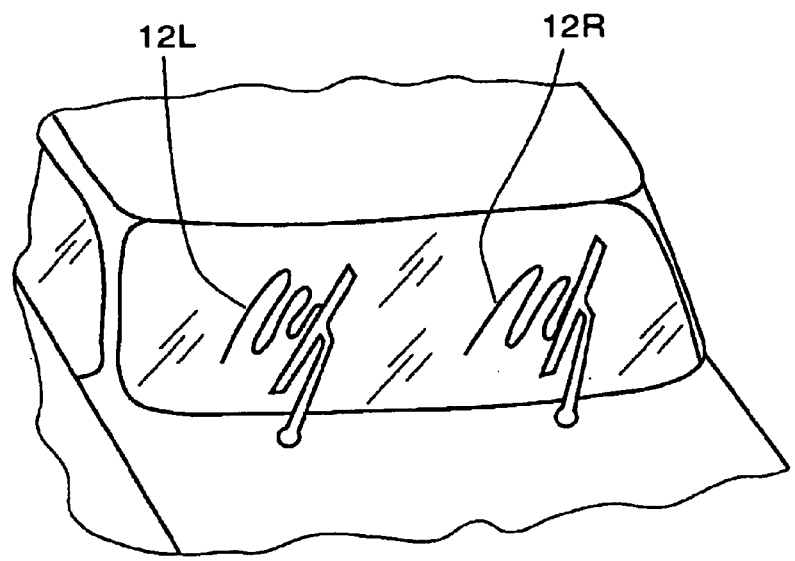
FIG. 2B is a diagrammatic illustration of a "wet arm" windshield washer system wherein the nozzles are mounted on the arms of the wiper blades.
Figure 2C:
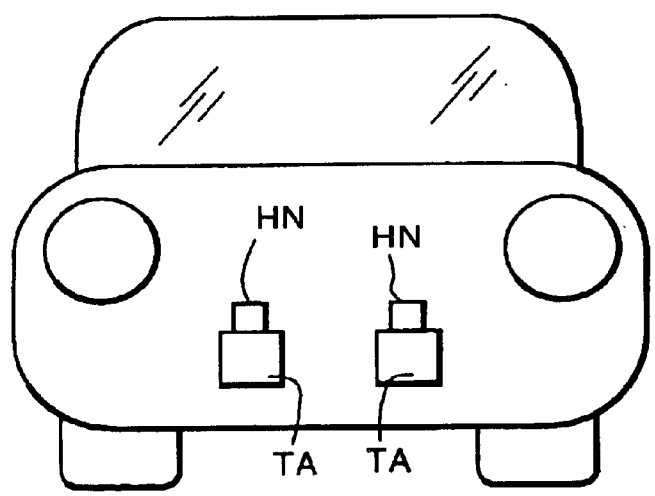
FIG. 2C is a diagrammatic sketch of a headlamp washer system incorporating the invention.

Referring to FIG. 1, the fluidic oscillator incorporated in the molded plastic body member PBM has a reversing chamber power nozzle PN for projecting a liquid jet from a source such as the washer fluid source as shown in FIGS. 2A, 2B and 2C, towards a reversing wall RW. A cover or housing member 12 is shown partially removed. A pair of counter-rotating vortices are produced in the interaction chamber IC and the jet of the liquid is transported around these vortices towards the exits. The instability of the jet causes the vortices to change in size and the asymmetric vortices in turn cause the jet to deflect by a large amount thus setting up the oscillation process.

A pair of liquid passages CH1 and CH2 lead from the reversing or interaction chamber IC on each side of the power nozzle PN, respectively. These outlet passages are smooth, and without any sharp directional changes, and extend to intersect at a common outlet CO which has a pair of diverging sidewalls SW1 and SW2. It will be noted that the pair of outlet passages CH1 and CH2 lead smoothly and are gradually curved without sharp and significant changes in direction to intersect at a common outlet. Each of the outlet passages CH1 and CH2 have an upstream beginning at the reversing chamber and a downstream end at the common outlet CO. Each passage first smoothly and gradually narrows to a minimum cross-sectional area and then gradually and smoothly expands to a maximum cross-sectional area at the common outlet.

It will be noted that the reversing chamber has a power nozzle inlet and the far wall reversing surface RW opposite the power nozzle inlet with the outside wall surfaces of the pair of outlet passages CH1 and CH2 defining an oval shape.

The invention has the following features:

1. The area ratio between the throat and the power nozzle is significantly high on the order of 2 to 4 compared to that of the conventional fluidic nozzle where it is a maximum of around 2.0. This large area ratio permits formation of larger drop sizes in the reversing chamber oscillator. The large throat area also reduces the clogging chances by a factor of at least two. This is because there is only one small flow restriction (power nozzle) in the device compared to three in the conventional device. Further, the power nozzle has the largest velocity to flush out any clogging material while there is no restricting or obstructing passages in the vicinity of the power nozzle exit.

2. There is a reduction of momentum due to the change of direction of the primary liquid jet in the reversing chamber portion of the device. This results in a lower velocity flow of the liquid which reduces ricochet of the drops from the impact surface. This is advantageous in cleaning spray nozzles.

3. The volume mean diameter of the droplets are significantly larger by about 500 microns compared to the conventional feedback fluidic nozzles of comparable flow rates.

4. There is less deviation of the droplet size from the mean droplet size as measured by the quantity defined as "uniformity". Uniformity of droplet size distribution (as opposed to uniformity of spray distribution) is a measure of the dispersion of the droplet diameter around the mean diameter. The smaller the value of uniformity, the smaller the range of diameters.

5. There are also less number of fine size droplets (<400 microns) in the reverse oscillator of this invention.

6. The frequency of oscillation for a given flow rate is significantly smaller (by a factor of three) for the reversing chamber oscillator of this invention.

7. The reversing chamber oscillator provides a better platform (simplicity) for manufacturing electrically heated spray nozzles.

8. There is no spray attachment to the sides of the nozzle even for very large spray fan angles β of up to 120°, and this minimizes dripping from the sides of the nozzle exit.

While the invention has numerous applications, it is particularly useful in liquid spray applications such as vehicle windshields, rear windows and headlamps. In FIG. 2A, the oscillator 11 is incorporated in a windshield 10 washer system nozzle 11 (which may be electrically heated) coupled by a tube 19 to a pump 13 and reservoir 16 of wash liquid 14. In FIG. 2B, the nozzles with reversing chamber oscillators of this invention are mounted on the wiper arms 12L and 12R. In FIG. 2C, the nozzles HN are mounted on a mechanical traversing arms TA of a headlamp washer system.

While a preferred embodiment of the invention has been illustrated and described, it will be appreciated that other adaptations, embodiments and modifications to the invention will be readily apparent to those skilled in the art.

What is claimed is:

1. In a reversing chamber oscillator device having an oscillation chamber with a reversing wall, a centrally located power nozzle for issuing a first liquid jet toward said reversing wall, and a pair of liquid passages for receiving liquid from said reversing chamber, one liquid passage on each side of said power nozzle, respectively, for alternately issuing periodic pulses of liquid, the improvement comprising a common outlet, said liquid passages are extended and lead smoothly and in a gradually curved manner, without sharp changes in direction, to intersect directly at said common outlet so that the alternate periodic liquid pulses issuing therefrom form a second liquid jet in at said common outlet which is periodically swept in said common outlet to ambient.

2. The reversing chamber oscillator device defined in claim 1 wherein each of said pair of liquid passages has an upstream end at said reversing chamber and a downstream end at said common outlet, respectively, each said liquid passage having an outer wall which, with said reversing wall, define an oval.

3. The reversing chamber oscillation device defined in claim 1 wherein said pair of liquid passages are identical and first smoothly and gradually narrows to a minimum cross-sectional area and then gradually expands to a maximum cross-sectional area at said common outlet.

4. A liquid spray device comprising a reversing chamber having a reversing wall, a centrally located power nozzle for issuing a first liquid jet toward said reversing wall, a pair of liquid passages for receiving discrete pulses of liquid in alternation from said reversing chamber, a common outlet, passage extensions on said liquid passages which passage extensions intersect at said common outlet, said passage extensions leading smoothly and gradually curve without sharp changes in direction to intersect at said common outlet wherein said alternate periodic pulses of liquid merge to form a second liquid jet.

5. The liquid spray device defined in claim 4 wherein said second jet is swept in said common outlet to ambient and said passages are such that the mean droplet size, in an operating fluid pressure range of 5 to 30 psi remains above 1500 microns.

6. A cleaning spray nozzle device comprising the spray nozzle defined in claim 5 wherein said second liquid jet has a velocity flow of liquid which reduces ricochet of the droplets from an impact surface.

7. The spray nozzle device defined in claim 4 wherein said liquid is a wash liquid which breaks up into droplets as said second liquid jet is swept in said common outlet to produce droplets with a mean droplet size above 1500 microns in an operating pressure range of 5 to 30 psi.

8. The spray nozzle device defined in claim 4 wherein said common outlet has a pair of sidewalls to each side thereof diverging in a downstream direction.

9. A liquid spray nozzle for spraying a liquid upon a surface comprising a fluidic oscillator having an oscillation chamber with a reversing wall, a centrally located power nozzle for issuing a first liquid jet towards said reversing wall, a pair of liquid passages for receiving liquid from said reversing chamber and alternately issuing periodic pulses of liquid, a common outlet, said pair of liquid passages having extensions which intersect directly at said common outlet and set the fan angle of a second liquid jet which is formed at said common outlet by said alternately issued periodic pulses of liquid and swept in the common outlet to ambient.

10. A liquid spray device defined in claim 9 wherein said liquid is a wash liquid which breaks up into droplets as said liquid jet is swept in said common outlet to ambient and said passages are such that the mean droplet size in an operating fluid pressure range of 5 to 30 psi, remains above about 1500 microns.

11. The liquid spray device defined in claim 10 wherein each said liquid passage has an outer wall which, with said reversing wall, define an oval.

12. The liquid spray device defined in claim 9 wherein said passage extensions extend from said reversing chamber in a direction to intersect at said common outlet, each said passage extension being gradually curved without sharp and significant changes in direction to intersect at said common outlet.

* * * * *